United States Patent [19]

Whitted

[11] Patent Number: 4,517,040

[45] Date of Patent: May 14, 1985

[54] METHOD OF MAKING A DECORATIVE PHOTO MIRROR

[76] Inventor: Linda J. Whitted, 728 E. Michigan Ave. #134, Orlando, Fla. 32806

[21] Appl. No.: 571,112

[22] Filed: Jan. 16, 1984

[51] Int. Cl.[3] ............................................ B32B 31/22

[52] U.S. Cl. ..................................... 156/153; 40/582; 156/256; 156/281; 156/645; 156/656; 156/664; 362/806; 428/3; 428/7; 428/14; 428/912.2

[58] Field of Search ............... 156/153, 154, 281, 256, 156/645, 656, 664; 40/582; 362/806; 428/3, 7, 13, 14, 15, 912.2

[56] References Cited

U.S. PATENT DOCUMENTS

| | | | |
|---|---|---|---|
| 1,788,562 | 1/1931 | Colbert et al. | 428/912.2 X |
| 2,065,406 | 12/1936 | Silverman | 40/582 X |
| 2,080,337 | 5/1937 | Powell | 428/912.2 X |
| 2,337,703 | 12/1943 | Wood | 40/582 |
| 2,807,111 | 9/1957 | Turner | 428/912.2 X |
| 3,440,128 | 4/1969 | Kubilius | 428/13 X |
| 4,173,667 | 11/1979 | Rusch | 428/14 X |
| 4,250,646 | 2/1981 | Trachtenberg | 40/582 |
| 4,253,910 | 3/1981 | Mason et al. | 428/912.2 X |
| 4,280,171 | 7/1981 | Huang | 362/806 X |

*Primary Examiner*—Robert A. Dawson

*Attorney, Agent, or Firm*—William M. Hobby, III

[57] ABSTRACT

A method of making a decorative mirrored image includes the steps of cutting a glass mirror to a predetermined size and shape and then removing a portion of the mirrored surface to form a vignetted pattern. The mirrored surface is then cleaned of chemical residue and material and a photo is attached over the glass portion having the mirrored surface removed and the mirror and image are mounted for display in a Christmas ornament, or the like. A Christmas ornament apparatus has an ornament housing with a means for attaching or supporting the ornament and a plurality of glass surfaces attached to the ornament housing. One or more of the glass surfaces is a mirrored surface surrounding an image and mounted to the Christmas ornament.

6 Claims, 10 Drawing Figures

METHOD OF MAKING A DECORATIVE PHOTO MIRROR

BACKGROUND OF THE INVENTION

The present invention relates to a method of making a mounted mirror with a vignetted image therein for mounting in a Christmas ornament, or the like, and to a Christmas ornament.

In the past, it has been common to make a wide variety of Christmas ornaments for hanging on Christmas trees as well as for setting on tables, in windows, or in other display positions. Typically these ornaments are glass spheres, but a great variety of custom ornaments have been made taking all sorts of decorative shapes. Very typically, prior Christmas ornaments have been utilized which display religious scenes such as the Nativity, the Three Wise Men, or other things symbolic of Christmas. Alternatively, decorations have used other less serious types of images.

The present invention is directed towards a method of making a Christmas ornament and the ornament itself using special decorative mirrored surfaces having vignetted portions for images placed therein. The ornaments can, of course, be used other than for Christmas and can be positioned on tables, attached to trees, or the like.

It has also been known in the past to make up novelty mirrors in which a portion of a glass surface is mirrored with a portion left unmirrored in some particular shape for the displaying of images therethrough. Typical of this prior art can be seen in the Andrusis U.S. Pat. No. 1,689,471 for an illuminated mirror album and clock in which a mirrored surface is manufactured with hearts and a plurality of circles for placing positive images thereon and having lights mounted on the back of the mirrored surface for illiminating the positive images. In U.S. Pat. No. 1,651,836 Rangel, a novelty mirror is shown in which a mirror is made having a portion left uncoated to provide a transparent section with means to rotate an image behind the transparent section to display nude images, or the like. In contrast to the prior art, the present invention is directed towards the making of a novelty mirror having a vignetted surface with an irregular pattern of removed mirrored surface with an image mounted therein for use in a Christmas ornament or other decorative mounting. By removing a portion of the mirrored surface in an irregular pattern, the size and shape of the mirrored images can be changed from image to image and a wide variety of mounting techniques can be utilized for displaying the images.

SUMMARY OF THE INVENTION

A method of making a decorative photo mirror includes the steps of cutting a glass mirror to a predetermined size and shape, then removing a portion of the mirrored surface in a vignetted irregular pattern, cleaning the mirror to remove residue chemicals and materials from the mirrored surface and attaching a photo over the glass portion having the mirrored surface removed. The mirror and photo are then mounted for display, which includes the mounting of the mirrored display in a Christmas ornament with transparent glass sections which may have other things mounted in the ornament for viewing through or into the interior of the ornament.

A christmas ornament is provided having an ornament housing and means for supporting the ornament to a tree, or the like, and a plurality of glass surfaces that are attached to the ornament housing. At least one of the glass surfaces is a mirrored surface having a portion of the mirrored surface removed in an uneven vignetted pattern and an image mounted therein. A 3-dimensional image can be placed inside the ornament for viewing through at least one or more of the glass surfaces, which is transparent.

BRIEF DESCRIPTION OF THE DRAWINGS

Other objects, features and advantages of the present invention will be apparent from the written description and the drawings, in which.

DESCRIPTION OF THE PREFERRED EMBODIMENTS

Figure 1:
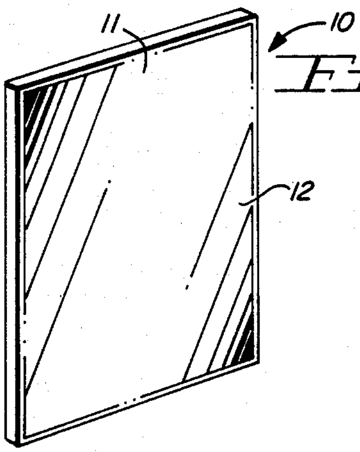
FIG. 1 shows a perspective view of a conventional glass mirror of selected size and shape.

Referring to the drawings and especially to FIGS. 1 through 6, the process of making a decorative photo mirror is illustrated in which a glass mirror 10 has a piece of glass 11 and a mirrored surface 12, including a black or gray back coating on the mirrored surface. The mirror 10 has been selected as to size and shapes and could be of any size and shape including circular, oval, or the like.

Figure 2:
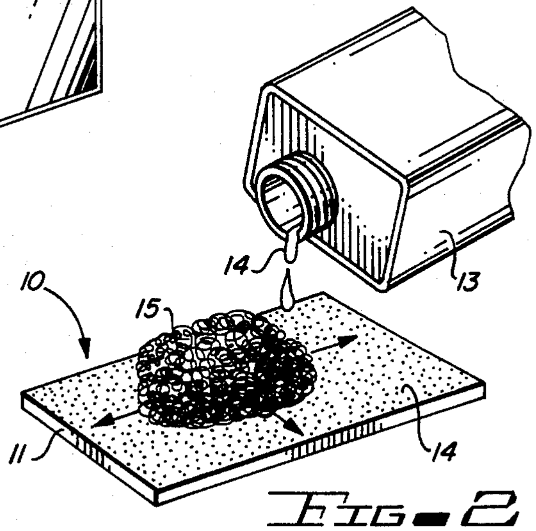
FIG. 2 is a perspective view showing the removal of a portion of the mirrored surface.
Figure 3:
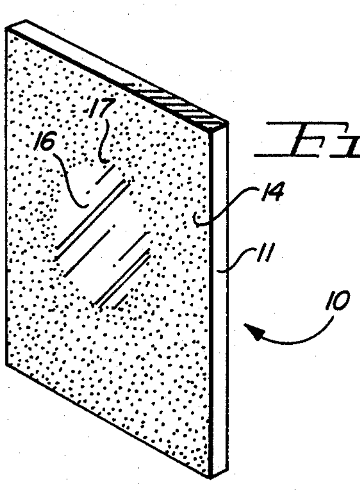
FIG. 3 is a perspective view of the mirror having a removed portion.
Figure 4:
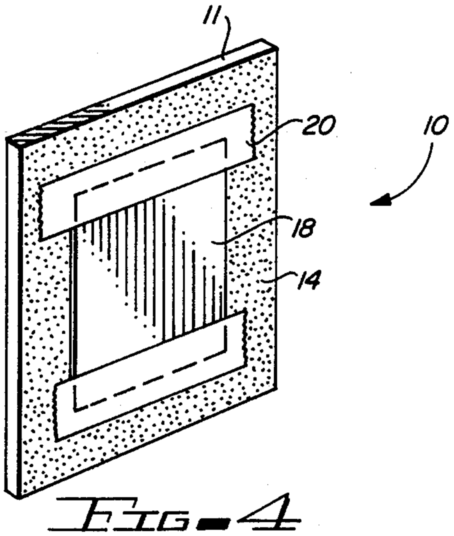
FIG. 4 is a perspective view of a photo image attached to the mirrored image of FIG. 3.
Figure 5:
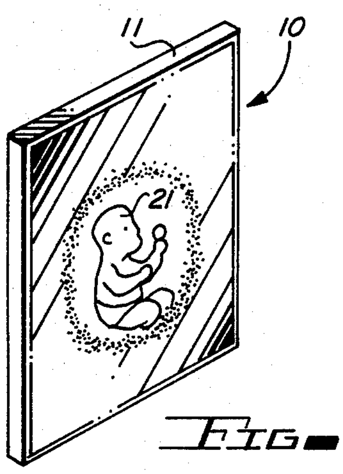
FIG. 5 is a front perspective view of the mirrored image of FIG. 4.
Figure 7:
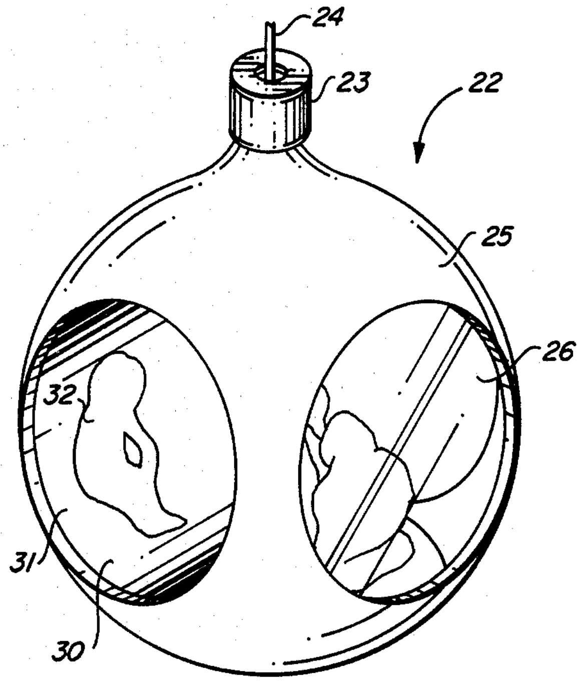
FIG. 7 is a perspective view of a Christmas ornament using the mirrored image.
Figure 8:
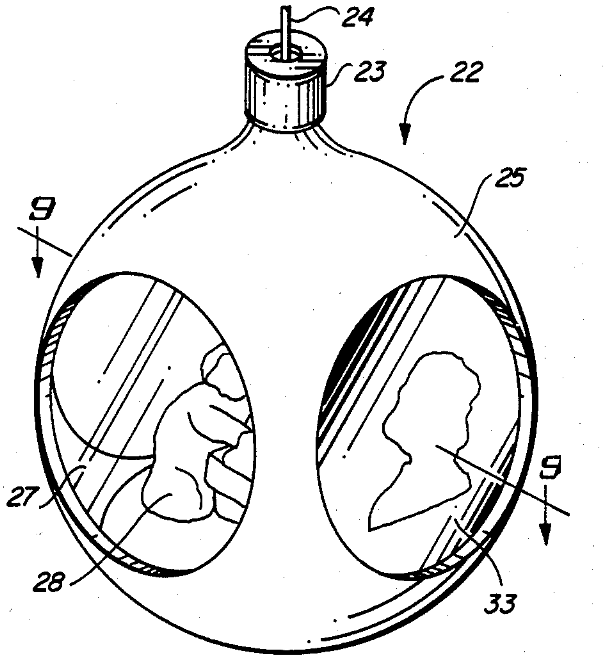
FIG. 8 is a perspective view of a Christmas ornament in accordance with FIG. 7.

In FIG. 2, a container 13 of paint remover is seen having the paint remover 14 applied to the black coated mirrored surface 14 and a piece of steel wool 15 is being used in conjunction therewith to romove a vignetted portion of the surface 14 in an uneven pattern around the edges, as shown in FIGS. 3 and 5. Once a portion of the mirrored surface 14 is removed from the surface of the glass 11 the mirror 10 is cleaned, leaving a transparent opening 16 and having the vignetted edges 17, as shown in FIG. 3. The cleaning can be accomplished by washing thoroughly in water, with or without a detergent, and followed by a dip in distilled water with a surfactant therein or alcohol, so that the finally dried image will not have mineral spots thereon. The cleaned and dried mirror 10 has a photograph or other image 18 attached thereto with a linen or other archival tape 20, as shown in FIG. 4, so that the image of 21 or a portion of it is vignetted in the mirror, as shown in FIG. 5.

Figure 6:
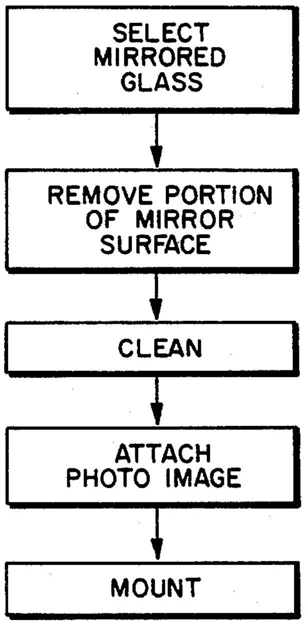
FIG. 6 is a flow diagram of the process of making the mirrored image of FIGS. 1 through 5.

FIG. 6 shows the steps of selecting the mirrored glass of predetermined size and shape in the first step and then removing a portion of the mirrored surface using a paint remover and steel wool, then cleaning the mirror of residue and chemicals, followed by drying the mirror. The next step is to attach a photo or other image to the back of the mirrored surface with tape or an adhesive, and then to mount the image in a Christmas ornament or other support for display.

FIGS. 7 through 10 show a Christmas ornament 22 in a generally spherical shape having an attaching member 23 with attaching wires 24 for attaching to a tree. The attaching means can, of course, also be a flat surface for setting on a table, or the like, without departing from the spirit and scope of the invention. The ornament 22 has a body 25 having a plurality of glass surfaces 26 mounted thereto. The glass surface 27 is transparent to show a 3-dimensional display 28 mounted in the Christmas ornament 22, while the glass surface 30 is a mirrored image 31 having a vignetted image 32 therein made in accordance with the process of FIGS. 1 through 6. The body can be made of any material desired, such as foamed polymer material including for instance, polystyrene, having the glass surfaces 26 mounted therein. The glass surfaces 26 can be attached after the 3dimensional object 28 is mounted, or alternatively, the mounting can take place in any order desired. An ornament housing can be disassembled, even though is it anticipated that a foamed polymer ornament would be one molded in one piece with the 3-dimensional object inserted through the windows prior to attaching the glass 26.

Figure 9:
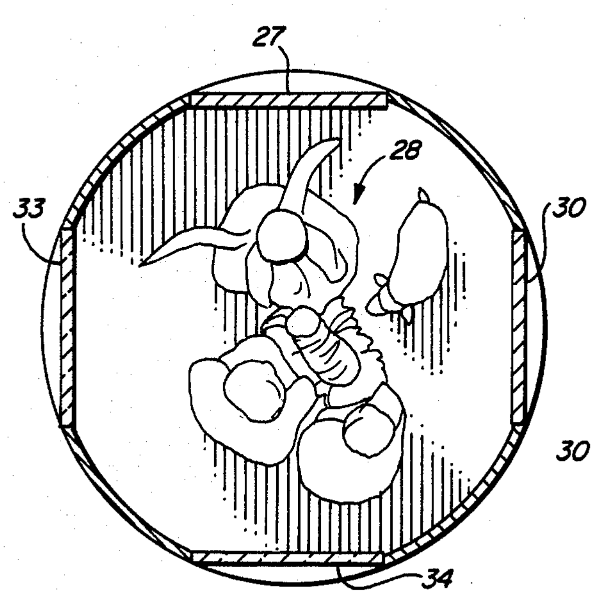
FIG. 9 is a side sectional view of the ornament in accordance with FIGS. 7 and 8.
Figure 10:
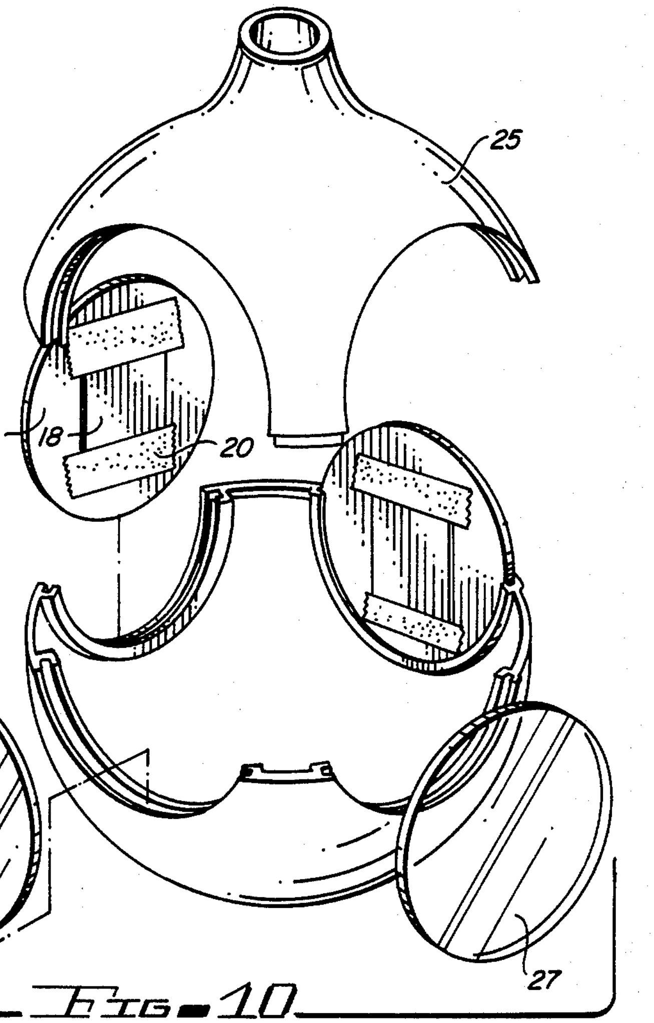
FIG. 10 is an exploded perspective view of the Christmas ornament in accordance with FIGS. 7 and 8.
Figure 10:
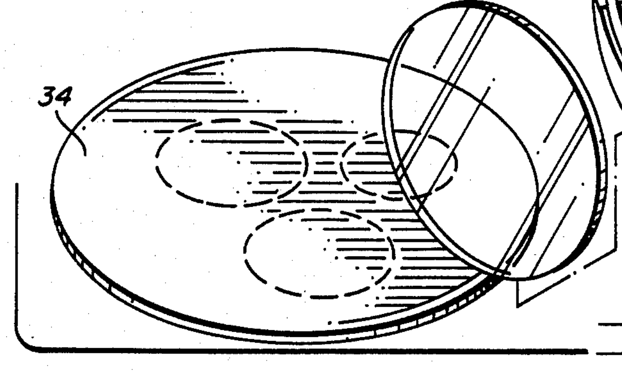

As shown in FIG. 9, the top sectional view has the mirrored glass 30, transparent glass 27, an additional piece of mirrored glass 33 with an image therein and an additional piece of clear glass 34. This allows the 3-dimensional scene 28 to be viewed through the mounted transparent glass surfaces 27 and 34, while the vignetted mirrored images 30 and 33 can have family, loved ones, or any photograph therein directly on the Christmas ornament, which can be set on a table or attached to a Christmas tree. The exploded view in FIG. 10 shows a disassembled ornament, even though it is anticipated that most ornaments will be of one molded member 25. This ornament shows a photo 18 attached with a tape 20 to a glass surface 30, along with transparent glass 27 and a removed surface 34 from inside the ornament for supporting the 3-dimensional scene 28.

It should be clear at this point that a method of making a Christmas ornament and decorative vignetted mounted mirrored surface has been provided, along with a Christmas ornament. However, it should also be clear that the present invention is not to be construed as being limited to the forms shown, which are to be considered illustrative rather than restrictive.

I claim:

1. A method of making a decorative photo mirror apparatus comprising the step of:

cutting a glass mirror to a predetermined size and shape;

removing a portion of the mirrored surface in a vignetted pattern, said removing a portion of the mirrored surface including applying a paint remover with an abrasive material for removing the mirrored surface;

cleaning the mirror to remove residue chemicals from the mirrored surface;

attaching an image over the glass portion having the mirrored surface removed; and mounting the mirror and image for display, whereby a decorative photo mirror is formed and mounted.

2. A method in accordance with claim 1, in which the step of removing a portion of the mirrored surface includes removing the mirrored surface with a paint remover and rubbing with steel wool.

3. A method in accordance with claim 2, in which the step of mounting the mirror image for display includes mounting the mirror and image to a Christmas ornament for display.

4. A method in accordance with claim 3, in which the steps of mounting the mirror and image for display includes mounting a pair of mirrors having photo images thereon on two side of a Christmas ornament.

5. A method in accordance with claim 4, in which the step of attaching an image over the glass portion includes taping a photograph over the glass portion having the mirrored surface removed.

6. A method in accordance with claim 5, including the step of mounting transparent glass surfaces to a Christmas ornament and a 3-dimensional display inside the Christmas ornament for viewing through the transparent glass surfaces.

* * * * *